(12) United States Patent
Khullar et al.

(10) Patent No.: US 10,187,212 B2
(45) Date of Patent: Jan. 22, 2019

(54) COMMUNICATION ARRANGEMENT

(71) Applicant: Fingerprint Cards AB, Göteborg (SE)

(72) Inventors: Anders Khullar, Bjärred (SE); Olis Olofsson, Malmö (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/608,050

(22) Filed: May 30, 2017

(65) Prior Publication Data

US 2017/0366351 A1 Dec. 21, 2017

(30) Foreign Application Priority Data

Jun. 20, 2016 (SE) ...................... 1650864

(51) Int. Cl.
| | | |
|---|---|---|
| *H01B 7/08* | (2006.01) | |
| *H04L 9/32* | (2006.01) | |
| *H01R 13/506* | (2006.01) | |
| *H01R 13/6463* | (2011.01) | |
| *H01R 13/6466* | (2011.01) | |
| *H01R 13/66* | (2006.01) | |

(52) U.S. Cl.
CPC ......... *H04L 9/3234* (2013.01); *H01B 7/0892* (2013.01); *H01R 13/506* (2013.01); *H01R 13/6463* (2013.01); *H01R 13/6466* (2013.01); *H01R 13/665* (2013.01); *H04L 9/3231* (2013.01); *H04L 2209/50* (2013.01)

(58) Field of Classification Search
CPC . H04L 63/0861; H04L 9/3234; H04L 9/3231; H04L 2209/50; H01B 7/0892; H01R 13/506; H01R 13/6463; H01R 13/6466; G06K 9/00154; G06K 9/00892
See application file for complete search history.

(56) References Cited

U.S. PATENT DOCUMENTS

| | | | |
|---|---|---|---|
| 7,278,025 B2 | 10/2007 | Saito et al. | |
| 7,953,670 B2 * | 5/2011 | Colella | ......... G06Q 10/06 235/380 |
| 2006/0204047 A1 | 9/2006 | Dave et al. | |
| 2007/0220272 A1 | 9/2007 | Campisi et al. | |
| 2008/0028230 A1 | 1/2008 | Shatford | |
| 2009/0240852 A1 | 9/2009 | Gou | |
| 2011/0082791 A1 * | 4/2011 | Baghdasaryan | ....... G06Q 20/10 705/44 |

(Continued)

FOREIGN PATENT DOCUMENTS

| | | |
|---|---|---|
| EP | 1 840 788 | 10/2007 |
| WO | WO 2016/055665 | 4/2016 |

OTHER PUBLICATIONS

Swedish Search Report from Swedish Application No. 1650864-0, dated Mar. 7, 2017.

(Continued)

*Primary Examiner* — Ali Bayat
(74) *Attorney, Agent, or Firm* — RMCK Law Group, PLC

(57) ABSTRACT

The present invention relates to a communication arrangement configured to allow wired communication between an electronic host device and an electrical slave device, such as between a smart phone and a smart card during an enrollment process. The invention also relates to a method for providing instructions to a user of a smart card during an enrollment process.

23 Claims, 4 Drawing Sheets

(56) References Cited

U.S. PATENT DOCUMENTS

| | | | |
|---|---|---|---|
| 2013/0045647 A1 | 2/2013 | Jenrich et al. | |
| 2013/0252456 A1 | 9/2013 | Kuczynski et al. | |
| 2014/0195815 A1* | 7/2014 | Taveau | G06F 21/32 |
| | | | 713/186 |
| 2016/0078277 A1* | 3/2016 | Sprigg | G06K 9/00174 |
| | | | 382/119 |
| 2016/0217312 A1* | 7/2016 | Gardiner | G06K 9/00087 |
| 2017/0068953 A1* | 3/2017 | Kim | G06Q 20/382 |
| 2017/0083882 A1* | 3/2017 | Kim | G06Q 20/102 |

OTHER PUBLICATIONS

Swedish Office Action for Swedish Application No. 1650864-0 dated Mar. 7, 2017, 8 pages.

\* cited by examiner

COMMUNICATION ARRANGEMENT

CROSS-REFERENCE TO RELATED APPLICATION

The present application is based on and claims the benefit of Swedish patent application Serial No. 1650864-0, filed Jun. 20, 2016, the content of which is hereby incorporated by reference in its entirety.

TECHNICAL FIELD

The present invention relates to a communication arrangement configured to allow wired communication between an electronic host device and an electrical slave device, such as between a smart phone and a smart card during an enrollment process. The invention also relates to a method for providing instructions to a user of a smart card during an enrollment process.

BACKGROUND OF THE INVENTION

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic equipment, such as smartphones, watches, tablets, or any other type of electronic devices where personalized user interaction is advantageous.

In the above typical prior art examples of electronic equipment having an integrated fingerprint sensor, the electronic equipment is generally provided with some form of graphical user interface (GUI) for instructing the user on how to start using the functionality provided by means of the fingerprint sensor. For example, the GUI may be specifically adapted to instruct the user on how to enroll a finger for allowing future authentication of the user. However, there also exists electronic equipment that lacks a GUI for providing suitable instructions to the user during the enrollment process. In such a case, the enrollment process as well as the general use of the fingerprint sensor may introduce an undue burden to the user.

As an alternative and as is disclosed in US20080028230, an external device such as a smart card reader may be used for providing messages to guide the user through the enrollment process while using the fingerprint sensor on the smart card. The external device should be kept secure, thereby not allowing a person who comes into unauthorized possession of the smart card to replace the authorized user's biometric data with the unauthorized user's biometric data.

However, even though US20080028230 shows an interesting approach to providing messages to the user during the enrollment process, there seems to be room for further improvement, both from a security and from a usability perspective.

SUMMARY OF THE INVENTION

In view of the above-mentioned security problems, it is an object of the present invention to provide an improved communication arrangement for allowing simplified interaction with electronic equipment having an embedded fingerprint sensor but lacking a suitable user interface for guiding a user when operating the fingerprint sensor.

According to an aspect of the present invention, it is therefore provided a communication arrangement arranged to electrically connect an electronic slave device to an electronic host device, the electronic slave device comprising a fingerprint sensor having an array of pixels and configured for capturing a fingerprint representation of a fingerprint pattern of a finger of a user, wherein the communication arrangement comprises a cable, a connector provided a first end of the cable and arranged to be detachably connected to contact pads comprised with the electronic slave device, a control unit electrically connected to a second end of the cable, and a physical interface for allowing the control unit to be electrically connected to the electronic host device, wherein the control unit is configured to convert communication signals from the electronic host device to the electronic slave device, the communication signals arranged to control capturing of the fingerprint representation using the fingerprint sensor at the electronic slave device.

By means of the invention, it is possible to provide a simple and intuitive arrangement that allows an electronic equipment having an embedded fingerprint sensor but lacking a suitable user interface, above denoted as an electronic slave device, to be connected to e.g. a smartphone, above denoted as an electronic host device, where the electronic host device will be in control of the operation of the fingerprint sensor provided at the electronic slave device. The communication arrangement is preferably provided together with the electronic slave device, advantageously already connected to the contact pads of the electronic slave device. Thus, once the user acquires/receives the electronic slave device, a reliable wired connection may easily be achieved by connecting the physical interface to the electronic host device.

In a preferred embodiment, the physical interface comprises for example a USB connector, allowing for example the electronic slave device to be arranged in wired communication with the electronic host device, through a standard port provided with the electronic host device. Any other form of universal connector may of course be provided, being within the scope of the present invention. The electronic host may in one embodiment be a smart phone, where the smartphone is provided with e.g. a USB interface for allowing wired communication as well as for charging the smart phone. The USB interface of the smartphone may thus be connected to the USB interface of the communication arrangement.

The cable as mentioned above is preferably at least one of a flexible flat cable or a flexible printed circuit. The control unit could in such an embodiment be integrated with e.g. the flexible printed circuit. Due to the cable being a flexible flat cable or a flexible printed circuit, it is possible to manufacture the communication arrangement to be both light and cheap. In addition, the flexibility will allow the communication arrangement be easily packed and distributed together with the electronic slave device, allowing the total cost of the combination of the electronic host device and the communication arrangement to be in comparison low.

This is further enhanced by the fact that the communication arrangement typically is provided without any form of user interface for providing any form of messages to the user, but that such messages rather are provided by means of an already available electronic host device, for example being one of the above mentioned smartphone, a tablet, a laptop, etc.

Within the context of the present disclosure, the expression "fingerprint representation" (or fingerprint image)

should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining the sets of features.

In an embodiment, the electronic slave device is a smart card, for example a hybrid smart card. The connector is in such an embodiment preferably configured to match the physical configuration of the standard contact pads comprised with the smart card. In addition, the connector is preferably provided with an adhesive element for securely connecting the connector of the communication arrangement to the contact pads of the smart card. As may be concluded from the above, an un-programmed ("new") smart card may be delivered to a user (e.g. by post from an issuing party), having the communication arrangement already connected to the contact pads of the smart card. Once received, the user may connect the physical interface, e.g. being the above mentioned USB connector, to his smartphone. The smartphone may in turn be equipped with an application ("App") providing the user with instruction as how to enroll his fingerprint with the smart card. Once the user has been informed that the enrollment process has been completed, the connector may be peeled off (being adhesive) from the contact pads and the smart card may be used as a stand-alone device. The communication arrangement may in then be discarded.

In some embodiments the smart card further comprises a wireless transceiver, for example adapted for at least one of Wi-Fi, Bluetooth, and NFC communication. The wireless functionality could for example be used once the user has enrolled his fingerprint with the smart card, for example for payment purposes as is known within the technical area of the invention.

Preferably, the control unit comprises means for automatically initiating communication between the fingerprint sensor and the electronic host device. Accordingly and in line with the above exemplary embodiment with the smart card and the smartphone, the control unit can be arranged to automatically activate the app for fingerprint enrollment once the control unit of the communication arrangement has established the wired connection to the smartphone. In a possible embodiment, the control unit has stored program code for the app to be executed at the smartphone and will accordingly transfer the stored program code to the smartphone once the wired connection has been established. Alternatively, or also, the control unit may provide e.g. an Internet link to the smartphone for initiating downloading of the adequate app to the smartphone.

In a preferred embodiment of the invention, at least one of the control unit and processing circuitry comprised with the smart card (or generally the electronic slave device) is configured to receive and validate authentication information provided from the electronic host device and only enter into an enrollment process if the authentication information is successfully validated. Accordingly, the user may be instructed to enter a previously provided (e.g. by a postal or electronic letter, or similar, provided separately from the delivery of the smart card) piece of authentication information before the process proceeds to allow the user to enroll his finger with the electronic slave device. Thus, a further security level is provided by means of the synergetic effect achieved by means of the combination of the electronic host device, the electronic slave device and the communication arrangement. The authentication information may for example be a PIN code or a password, to be entered within the GUI provided at the electronic host device.

Following the above discussion, the communication arrangement according to the present invention is preferably provided as a component of smart card system further comprising an electronic slave device in the form of a smart card comprising the above mentioned contact pads. The smart card system may typically be delivered to an end user as a kit of parts where the communication arrangement is pre-connected to the smart card, arranged for future detachment.

It should be understood that the fingerprint sensor preferably is a fingerprint touch sensor; however the invention may also be implemented using e.g. a swipe fingerprint sensor. The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the invention.

Within the context of the present disclosure, the expression "fingerprint data" should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining sets of fingerprint features.

The expression "processing circuitry" as used above should be understood to include any type of computing device, such as an ASIC, a micro-processor, etc. It should also be understood that the actual implementation of such a processing circuitry may be divided between more than a single device/circuit.

According to another aspect of the present invention, there is provided a method for providing instructions to a user of a smart card during an enrollment process, the smart card comprising a fingerprint sensing system including a fingerprint sensor having an array of pixels and configured for capturing a fingerprint representation of a fingerprint pattern of a finger of a user and processing circuitry connected to and configured to control the operation of the fingerprint sensor, the method comprising the steps of establishing a connection for data communication between the fingerprint sensing system of the smart card and an electronic host device, the electronic host device comprising a user interface, providing, within the user interface of the electronic host device, the user with an instruction to enter authentication information, validating the authentication information, providing, within the user interface of the electronic host device, the user with an instruction to position the finger at the fingerprint sensor, if a result of the validation is successful, acquiring, using the fingerprint sensor, a fingerprint representation, extracting, using the processing circuitry, fingerprint features from the fingerprint representation, forming a fingerprint template for user authentication based on the extracted fingerprint features, and storing the fingerprint template within a digital memory comprised with the smart card.

This aspect of the invention provides similar advantages as discussed above in relation to the previous aspect of the invention. It should however be noted that the data communication between the fingerprint sensing system and the electronic host device in accordance to this aspect of the invention may be either wired or wireless. The wired communication is preferably achieved using the communication arrangement as is discussed above. The wireless communication may for example be achieved using any form of wireless protocol, including for example Wi-Fi, Bluetooth, and NFC communication.

However, in accordance to the present aspect of the invention it is defined that the user is to enter the above mentioned authentication information prior to that enrolling the finger of the user. Accordingly, it an improved security level may be achieved as compared to prior art.

In an embodiment of the invention, at least one of the communication arrangement and the smart card is "locked" once the enrollment process has completed. Accordingly, the communication arrangement may be safely discarded, securing that no further use is allowed, even by the rightful user. The same account for the smart card. It should be understood that locking also may be done in case authentication attempts failed reaches an unacceptable level.

In accordance to a still further aspect of the invention there is provided computer readable medium storing a program for providing instructions to a user of a smart card during an enrollment process, the smart card comprising a fingerprint sensing system including a fingerprint sensor having an array of pixels and configured for capturing a fingerprint representation of a fingerprint pattern of a finger of a user and processing circuitry connected to and configured to control the operation of the fingerprint sensor, in accordance to the above discussed method. Also this aspect of the invention provides similar advantages as discussed above in relation to the previous aspects of the invention.

In summary, the present invention relates to a communication arrangement configured to allow wired communication between an electronic host device and an electrical slave device, such as between a smart phone and a smart card during an enrollment process. The present invention provides a solution that simplifies user interaction with e.g. a smart card during an initial user enrollment.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
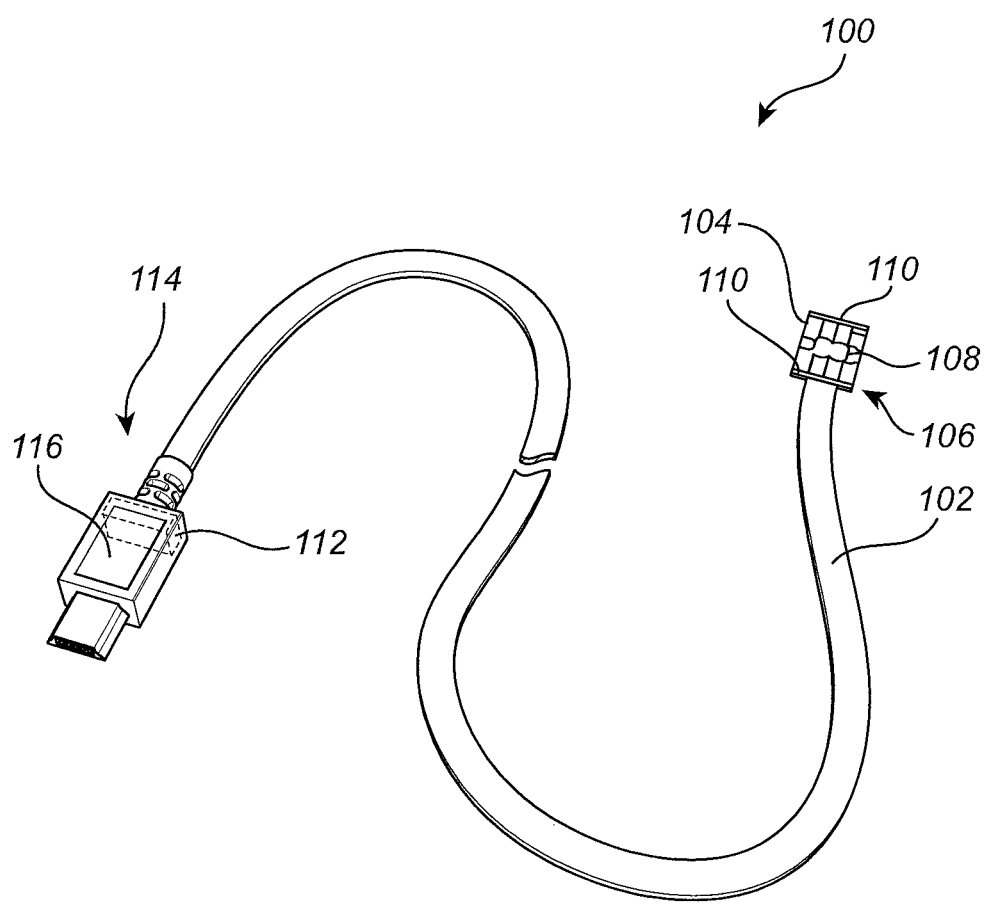
FIG. 1 conceptually illustrates a communication arrangement according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated a communication arrangement 100 according to the present invention. The communication arrangement 100 comprises a cable 102, a connector 104 provided a first end 106 of the cable 102 and arranged to be detachably connected to contact pads comprised with an electronic slave device as will be further discussed below. The connector 104 in turn comprises electrical connection elements 108 provided with adhesive portions 110 for secure connection to the contact pads of the electronic slave device. Furthermore, the communication arrangement 100 comprises a control unit 112 electrically connected to a second end 114 of the cable 102, and a physical interface 116 for allowing the control unit 112 to be electrically connected to an electronic host device as will be further exemplified in FIG. 2. The physical interface 116 may in some embodiment be an USB "plug", mini USB plug, USB-C plug, etc.

In some embodiments, the control unit 112 typically includes functionality for converting signals from UART to USB or from USB to UART. Such functionality may possibly also be provided by means of an additional chip or as integrated with the control unit 112. In addition, the control unit 112 may be unified with the physical interface 116 to form a single body for minimization. The general functionality for signal conversion, may as understood, be performed differently, still within the scope of the invention. Furthermore, other protocols may be possible in line with the present invention.

Figure 2:
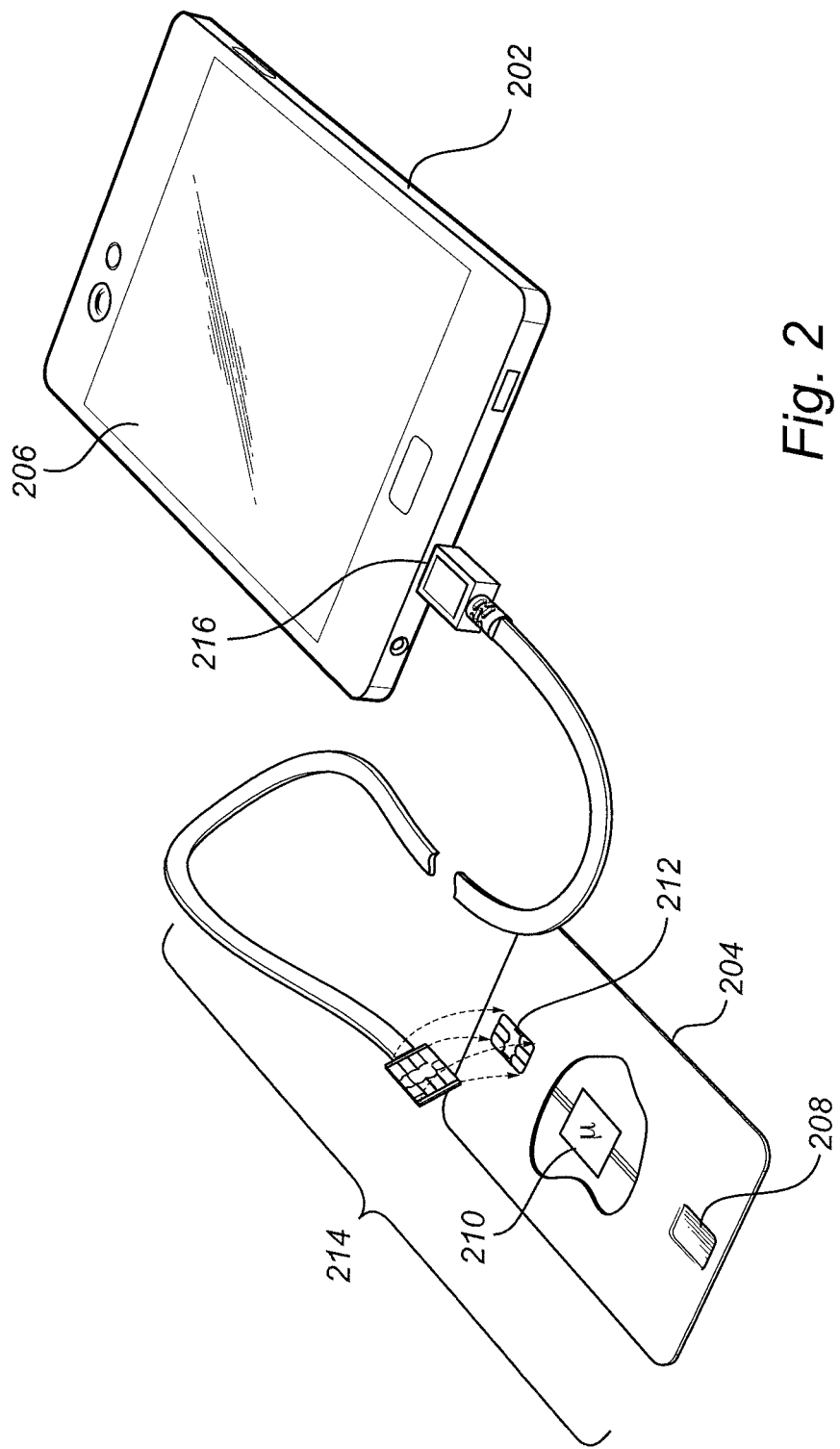
FIG. 2 schematically exemplifies a portable electronic host device connected to an electronic slave device using the communication arrangement as shown in FIG. 1.

In FIG. 2 there is provided an example of use of the communication arrangement 100 for providing a wired connection between a mobile phone (e.g. a so called "smartphone") 202 and a smart card 204.

The smartphone 202 comprises a display unit 206 with a touch screen interface. Preferably and as is apparent for the skilled person, the smartphone 202 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device. The smartphone 202 further comprises an interface 216, a "socket", correspondingly adapted for receiving the plug of the physical interface 116.

The smart card 204 is provided with a fingerprint sensing system including a fingerprint sensor 208 having an array of pixels and configured for capturing a fingerprint representation of a fingerprint pattern of a finger of a user and processing circuitry 210 connected to and configured to control the operation of the fingerprint sensor 208. In this embodiment the fingerprint sensor 208 is arranged on the front side of the smart card 204. However, the fingerprint sensor 208 may as an alternative (or also) be provided on a back side of the smart card 204. The fingerprint sensor 208 may, for example, be used for authenticating the user when performing a payment/transaction, for example allowing the smart card 204, once the finger of the user has been enrolled, to interact with a POS terminal (not shown). Furthermore, the smart card 204 comprises a plurality of contact pads 212 electrically connected to at least the processing circuitry 210. The smart card 204 forms together with the communication arrangement 100 a smart card system 214.

The processing circuitry 210 further comprises a memory, such as a database, e.g. for storing one or a plurality of fingerprint template for one or a plurality of fingers for the user. The processing circuitry 210 may each include a microprocessor, microcontroller, programmable digital signal processor or another programmable device. The processing circuitry 210 may also, or instead, each include an application specific integrated circuit, a programmable gate array or programmable array logic, a programmable logic device, or a digital signal processor. Where the processing circuitry 210 includes a programmable device such as the microprocessor, microcontroller or programmable digital signal processor mentioned above, the processor may further include computer executable code that controls operation of the programmable device. It should be understood that all or some parts of the functionality provided by means of the processing circuitry 210 (or generally discussed as "processing circuitry") may be at least partly integrated with the fingerprint sensor 208.

Figure 3:
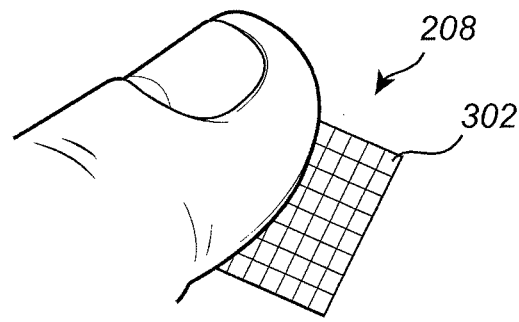
FIG. 3 schematically shows the fingerprint sensor array integrated with the electronic slave device.

With further reference to FIG. 3, there is conceptually illustrated a somewhat enlarged view of the fingerprint sensor 208. In the case of employing a capacitive sensing technology, the fingerprint sensor 208 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 3 indicated by reference numeral 302.

Figure 4A:
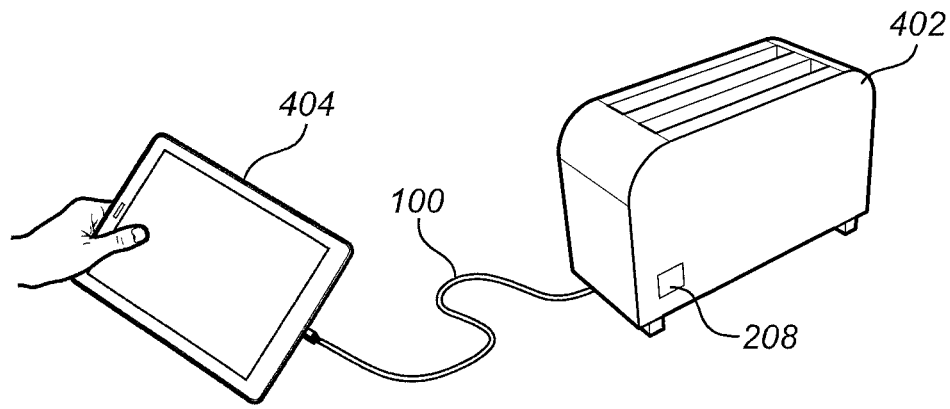
FIGS. 4a and 4b shows alternative uses of the communication arrangement.
Figure 4B:
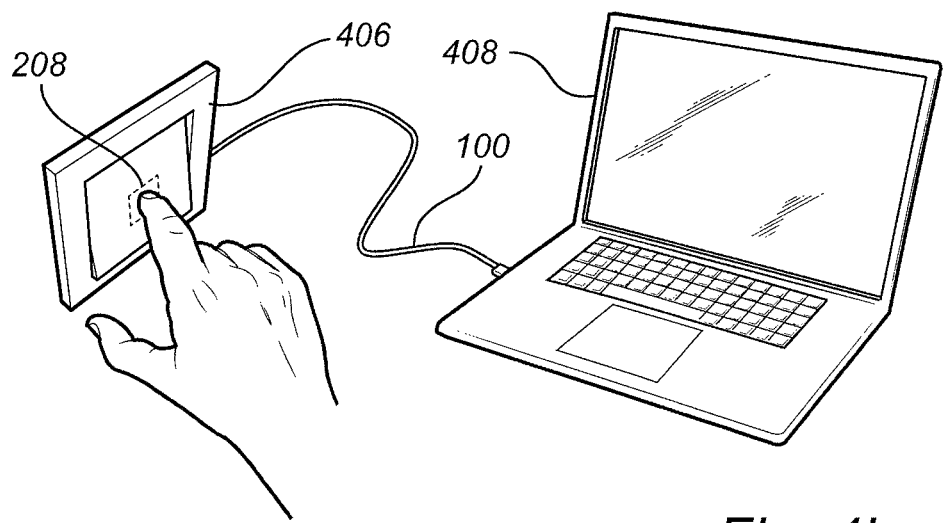

A further example of use of the communication arrangement 100 is shown in FIG. 4a. Specifically, the communication arrangement 100 is provided to connect an electronic slave device in the form of a toaster 402 to an electronic host device in the form of a tablet 404. Similarly and as shown in FIG. 4b, the communication arrangement 100 is provided to connect an electronic slave device in the form of a light button 406 to an electronic host device in the form of a laptop 408. As understood from the above, any type of electronic slave device, i.e. an electronic device comprising a fingerprint sensing system but lacking a suitable user interface for enrolling a finger of a user, may be provided with a wired connection (using the communication arrangement 100) for connecting to an electronic host device having suitable means for instructing the user during the fingerprint enrollment process. Once the enrollment process has been completed, the communication arrangement 100 is typically detected from the electronic host device and removed (e.g. by pealing of the adhesive connector from contact pads) of the electronic slave device.

Figure 5:
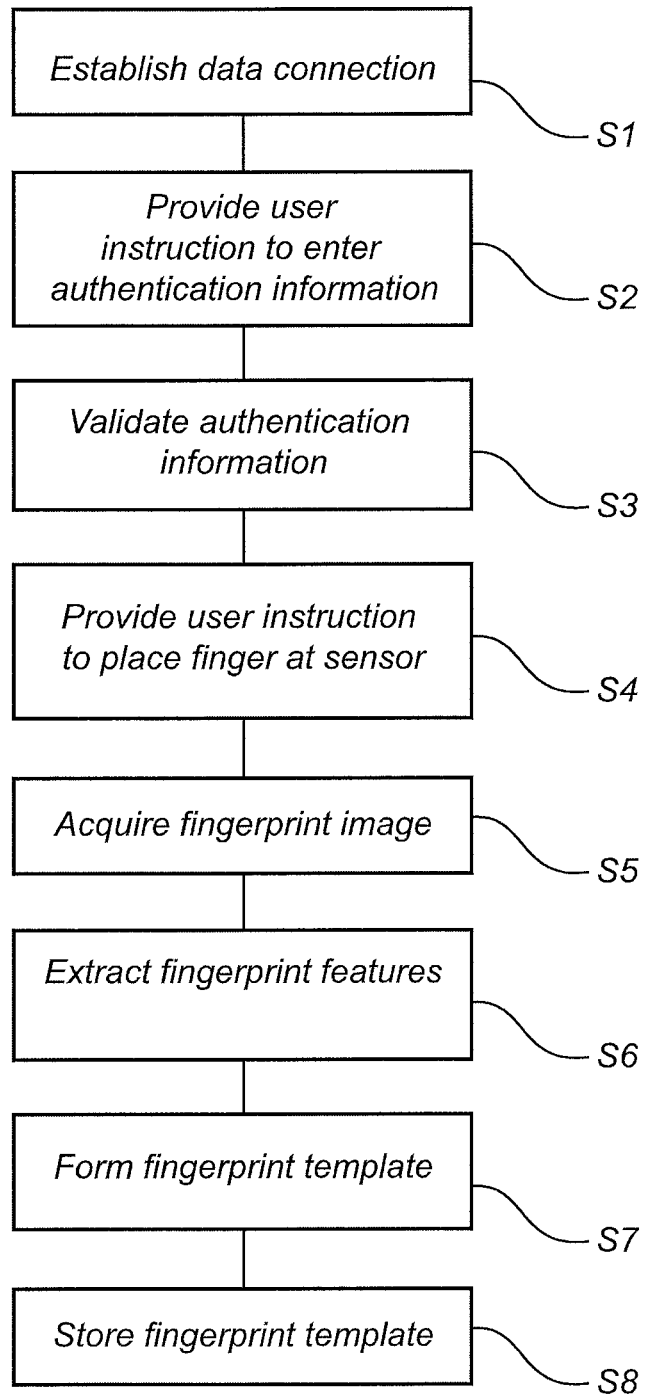
FIG. 5 is a flowchart illustrating the exemplary steps of the invention for fingerprint enrollment of a user with a smart card.

Turning finally to FIG. 5, flowchart illustrating the exemplary steps of the invention for fingerprint enrollment of a user using the smart card 204 provided with a fingerprint sensor 208. As a first step, a connection for data communication is established, S1, between the fingerprint sensing system of the smart card 204 and an electronic host device, such as the smartphone 202. The connection is preferably provided using the above disclosed communication arrangement 100, but could alternatively be provided using the wireless connection between e.g. the smartphone 202 and the smart card 204, e.g. using NFC, Wi-Fi, etc.

Once the data communication between the electronic devices has been established, the user will be provided, S2, with an instruction to enter e.g. the above mentioned PIN number as a piece of authentication information, within a user interface provided using the display 206 of the smartphone 202. The authentication information is validated, S3, typically involving information pre-stored to the smart card 204. The validation may also involve communication between the smartphone 202 and a remotely arranged server (not shown), for authenticating the user. If the authentication information, e.g. the PIN, has been successfully validated, the user is further provided, S4, with an instruction to position the finger at the fingerprint sensor 208. The instruction may for example include guidance as how the finger is to be positioned, re-positioned in case of a non-correct positioning, etc. Subsequently, a fingerprint image is acquired, S5, using the fingerprint sensor 208. The processing circuitry 210 provided with the smart card 204 will then extract, S6, extracting fingerprint features from the fingerprint image and form, S7, a fingerprint template for user authentication based on the extracted fingerprint features. Finally, the fingerprint template is stored, S8, within a digital memory comprised with the smart card 204.

In a typical implementation of the present invention, the user interface is provided within an app of the smartphone 202, and the app will also inform once a successful enrollment of the finger has been completed. The smart card 204 and/or the communication arrangement 100 may subsequently be locked from any further use, e.g. for re-enrollment or for us with a different electronic slave device. Alternatively, the smart card 204 and/or the communication arrangement 100 may be locked in case the validation of e.g. the PIN has failed (more than a preselected number of times), or due to other reasons. The app may in some embodiments be a native app provided with the electronic host device, or to be downloaded when needed, for example from the control unit 112, from the processing circuitry 210, or from a remote server (such as an "app store"). Downloading of the app to the smartphone 202 may be automatic, e.g. initiated once the data communication has been established between the smartphone 202 and the smart card 204.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A communication apparatus arranged to electrically connect an electronic slave device to an electronic host device, the electronic slave device comprising a fingerprint sensor having an array of pixels and configured for capturing a fingerprint representation of a fingerprint pattern of a finger of a user, wherein the communication apparatus comprises:
   a cable,
   a connector provided a first end of the cable and arranged to be detachably connected to contact pads comprised with the electronic slave device,
   a control unit electrically connected to a second end of the cable, and
   a physical interface for allowing the control unit to be electrically connected to the electronic host device,
   wherein the control unit is configured to:
      convert communication signals from the electronic host device to the electronic slave device, the communication signals arranged to control capturing of the fingerprint representation using the fingerprint sensor at the electronic slave device for enrolling the finger of the user, and
      lock the communication apparatus if the enrollment is successful, thereby preventing further communication to be performed between the electronic host device and the electronic slave device using the communication apparatus.

2. The communication apparatus according to claim 1, wherein the captured fingerprint representation is stored within a memory element comprised with the electronic slave device.

3. The communication apparatus according to claim 1, wherein the cable is a flexible flat cable.

4. The communication apparatus according to claim 1, wherein the cable is flexible printed circuit and the control unit is comprised with the flexible printed circuit.

5. The communication apparatus according to claim 1, wherein the connector comprises an adhesive element for securely connecting the connector to the electronic slave device.

6. The communication apparatus according to claim 1, wherein the physical interface comprises an USB connector.

7. The communication apparatus according to claim 1, wherein the control unit is configured to convert communication signals between USB and UART.

8. The communication apparatus according to claim 1, wherein the electronic slave device is a smart card.

9. The communication apparatus according to claim 8, wherein the smart card is a hybrid smart card.

10. The communication apparatus according to claim 8, wherein the smart card further comprises processing circuitry connected to and configured to control the operation of the fingerprint sensor.

11. The communication apparatus according to claim 10, wherein the smart card further comprises a wireless transceiver electrically connected to and controlled by the processing circuitry.

12. The communication apparatus according to claim 11, wherein the wireless transceiver is adapted for at least one of Wi-Fi, Bluetooth, and NFC communication.

13. The communication apparatus according to claim 1, wherein the electronic host device is at least one of a computer, a tablet and a smartphone.

14. The communication apparatus according to claim 1, wherein the control unit comprises means for automatically initiating communication between the fingerprint sensor and the electronic host device.

15. The communication apparatus according to claim 1, wherein the control unit is configured to receive and validate authentication information from the electronic host device, and the electronic slave device is configured to enter into an enrollment process if the authentication information is successfully validated.

16. The communication apparatus according to claim 10, wherein the processing circuitry is configured to receive and validate authentication information from the electronic host device, and the smart card is configured to enter into an enrollment process if the authentication information is successfully validated.

17. A smart card system, comprising:
   an electronic slave device being a smart card comprising contact pads, and
   a communication apparatus according to claim 1 detachably connected to the contact pads of the smart card.

18. A method for providing instructions to a user of a smart card during an enrollment process, the smart card comprising a fingerprint sensing system including a fingerprint sensor having an array of pixels and configured for capturing a fingerprint representation of a fingerprint pattern of a finger of a user and processing circuitry connected to and configured to control the operation of the fingerprint sensor, the method comprising:
   establishing a connection for data communication between the fingerprint sensing system of the smart card and an electronic host device, the electronic host device comprising a user interface;
   providing, within the user interface of the electronic host device, the user with an instruction to enter authentication information;
   validating the authentication information;

providing, within the user interface of the electronic host device, the user with an instruction to position the finger at the fingerprint sensor, if a result of the validation is successful;

acquiring, using the fingerprint sensor, the fingerprint representation;

extracting, using the processing circuitry, fingerprint features from the fingerprint representation;

forming a fingerprint template for user authentication based on the extracted fingerprint features, and storing the fingerprint template within a digital memory comprised with the smart card, wherein the connection for data communication between the fingerprint sensing system and the electronic host device is provided using a wired communication arrangement, and the method further comprises:

locking the communication arrangement if the enrollment process is successful, thereby preventing further communication to be performed between the electronic host device and the smart card using the communication arrangement.

19. The method according to claim 18, further comprising:

providing, within the user interface of the electronic host device, the user with information that the enrollment process has been concluded.

20. The method according to claim 18, wherein the communication arrangement comprises:

a cable;

a connector provided a first end of the cable and arranged to be detachably connected to contact pads comprised with the smart card, a control unit electrically connected to a second end of the cable, and a physical interface for allowing the control unit to be electrically connected to the electronic host device, wherein the control unit is configured to convert communication signals from the electronic host device to the smart card, the communication signals arranged to control the fingerprint sensing system at the smart card to capture the fingerprint representation.

21. The method according to claim 18, wherein the electronic host device is a smartphone and the method further comprising the steps of:

executing an application (app) having a graphical user interface (GUI) at the smartphone for providing the instruction to the user.

22. The method according to claim 18, further comprising the step of:

locking the smart card, thereby preventing further enrollment processes to be performed.

23. A non-transitory computer readable medium storing a program for providing instructions to a user of a smart card during an enrollment process, the smart card comprising a fingerprint sensing system including a fingerprint sensor having an array of pixels and configured for capturing a fingerprint representation of a fingerprint pattern of a finger of a user and processing circuitry connected to and configured to control the operation of the fingerprint sensor, according to claim 18.

* * * * *